June 20, 1972  A. J. GRINER ET AL  3,671,163
SNACK FOOD FORMING APPARATUS
Filed June 2, 1969  7 Sheets-Sheet 1
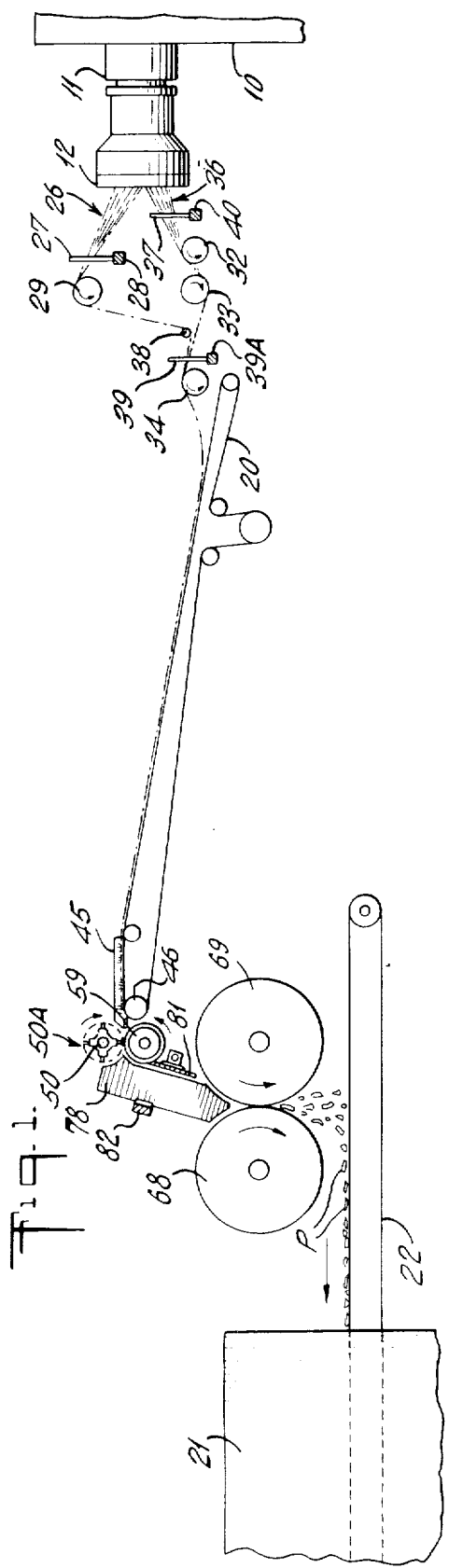
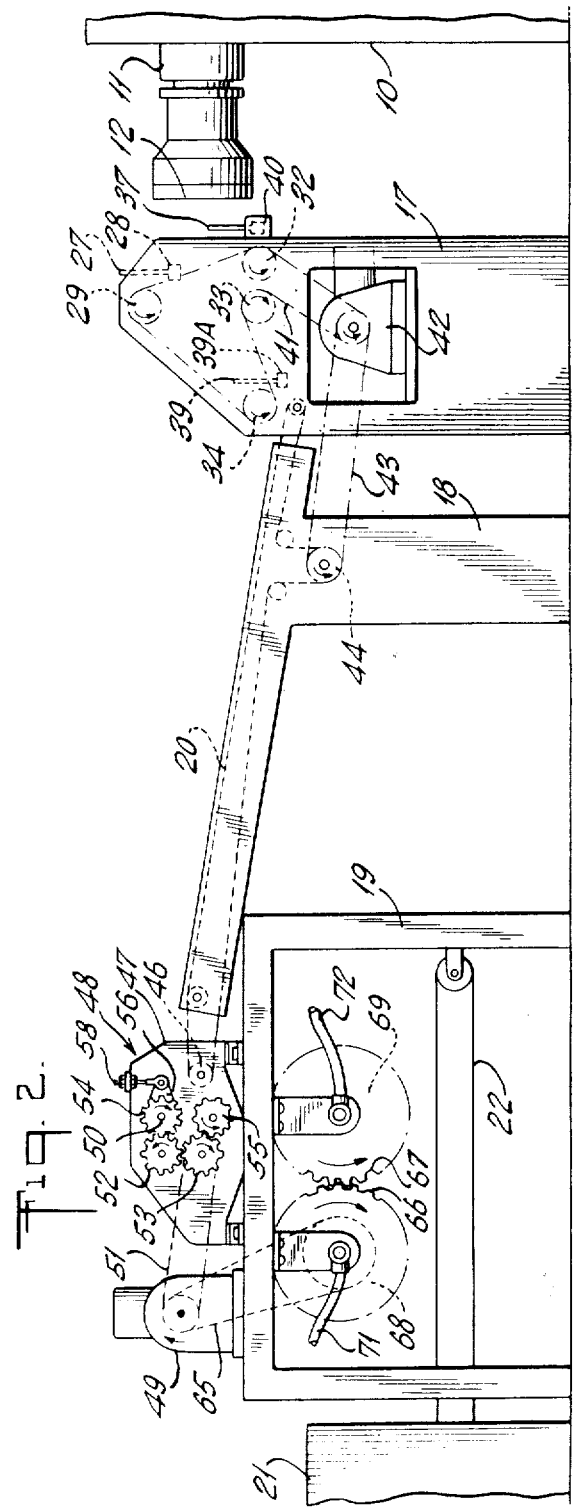
INVENTORS
ARTHUR J. GRINER
WILLIAM A. BLAIN
BY
AGENT

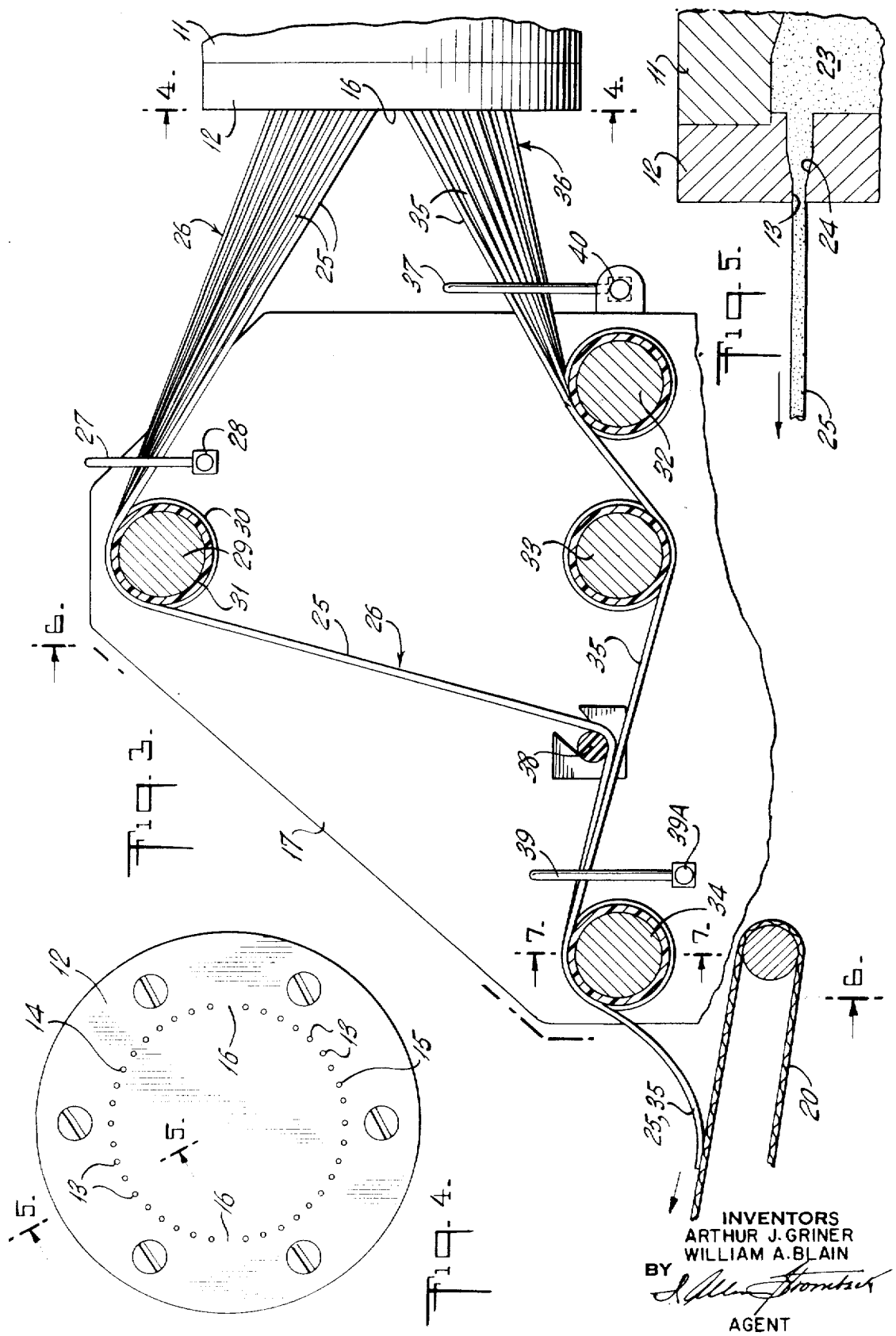

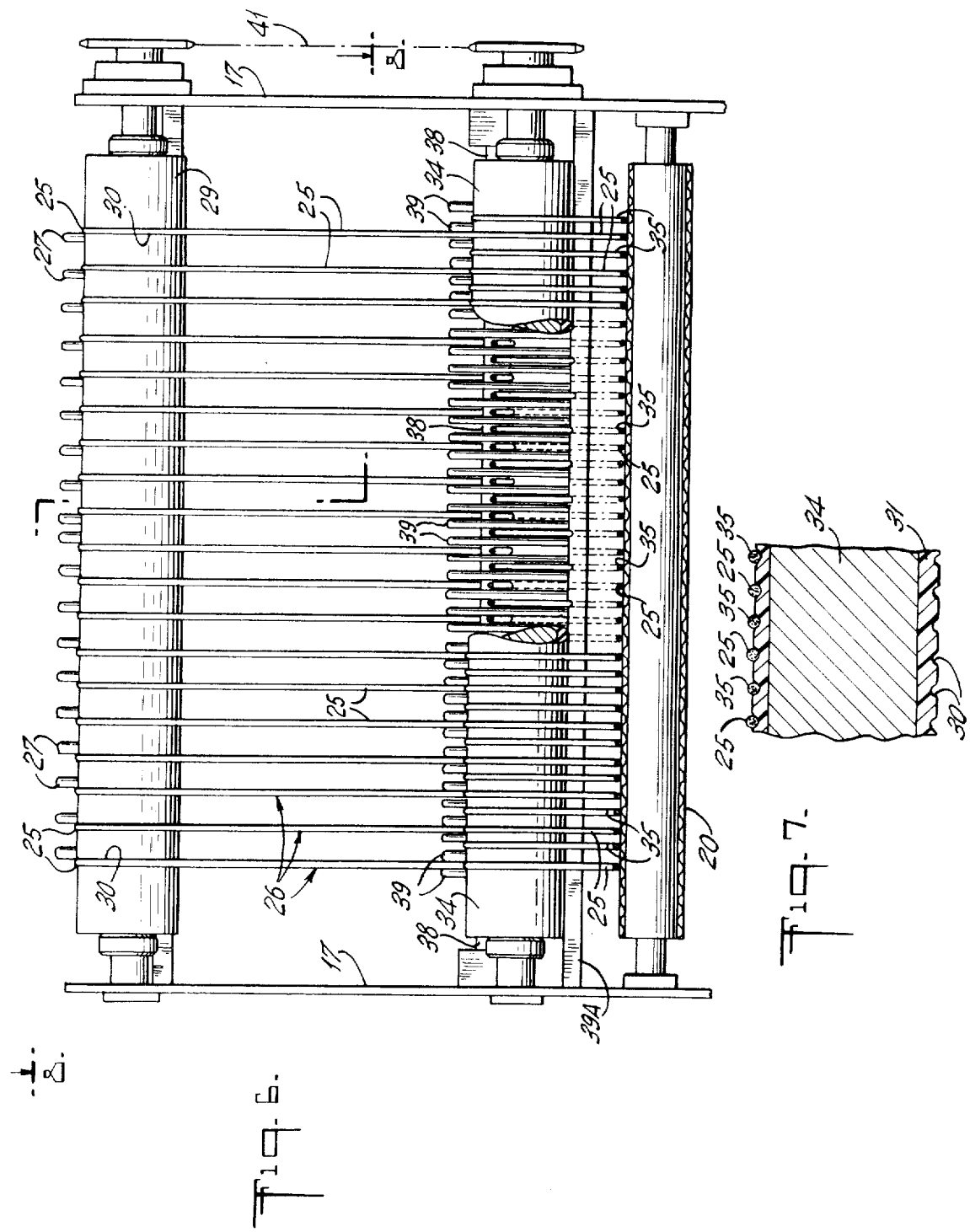

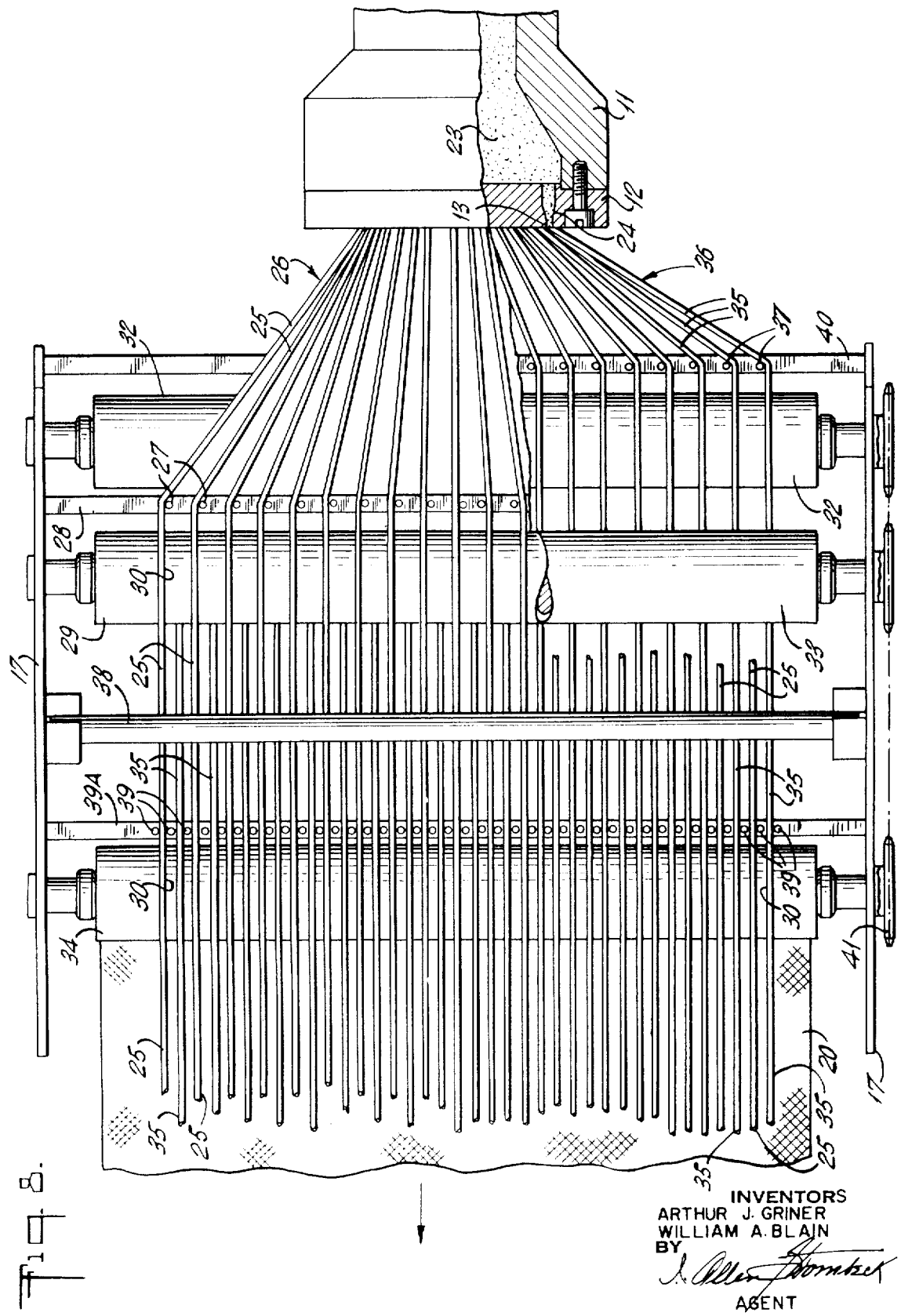

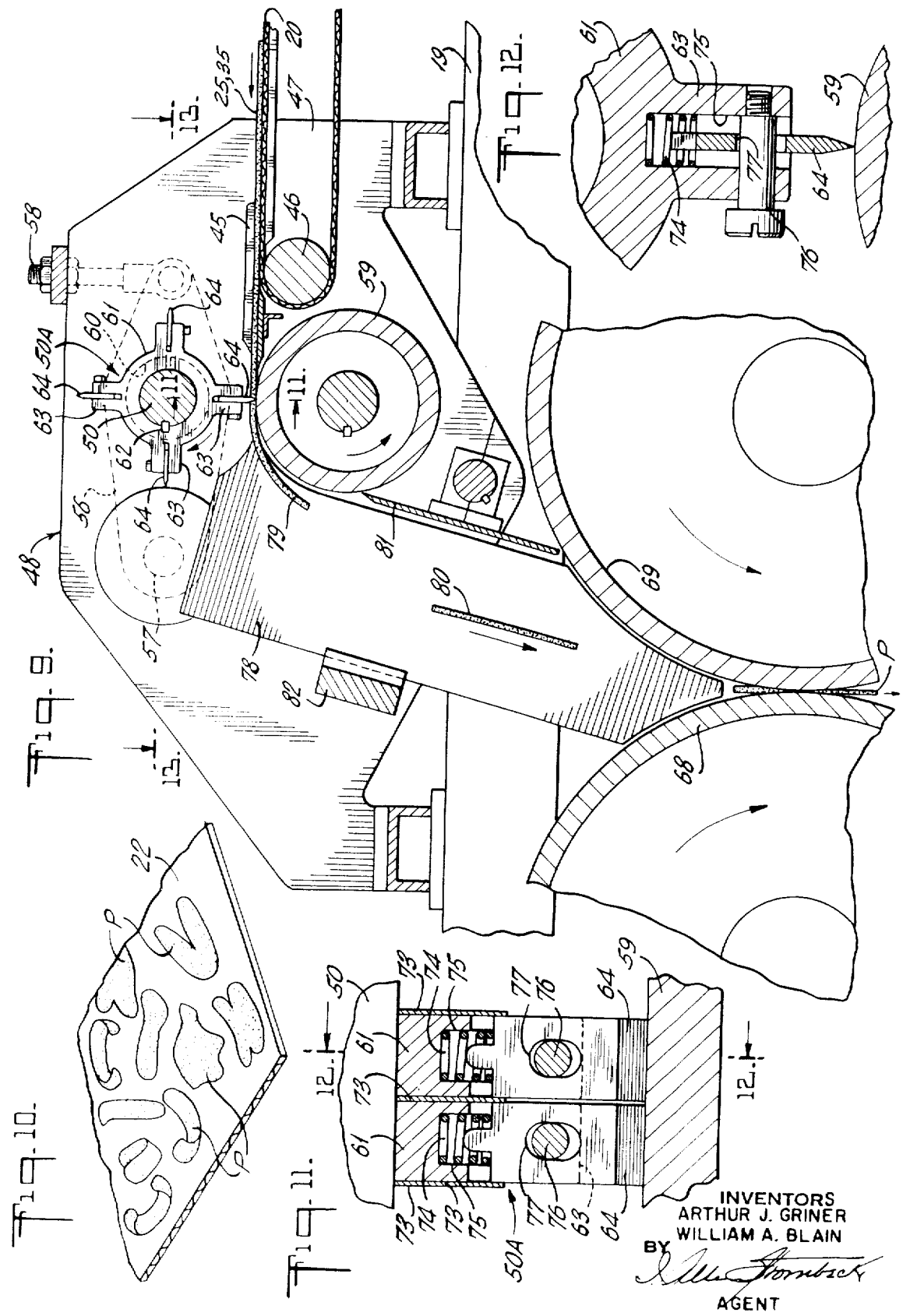

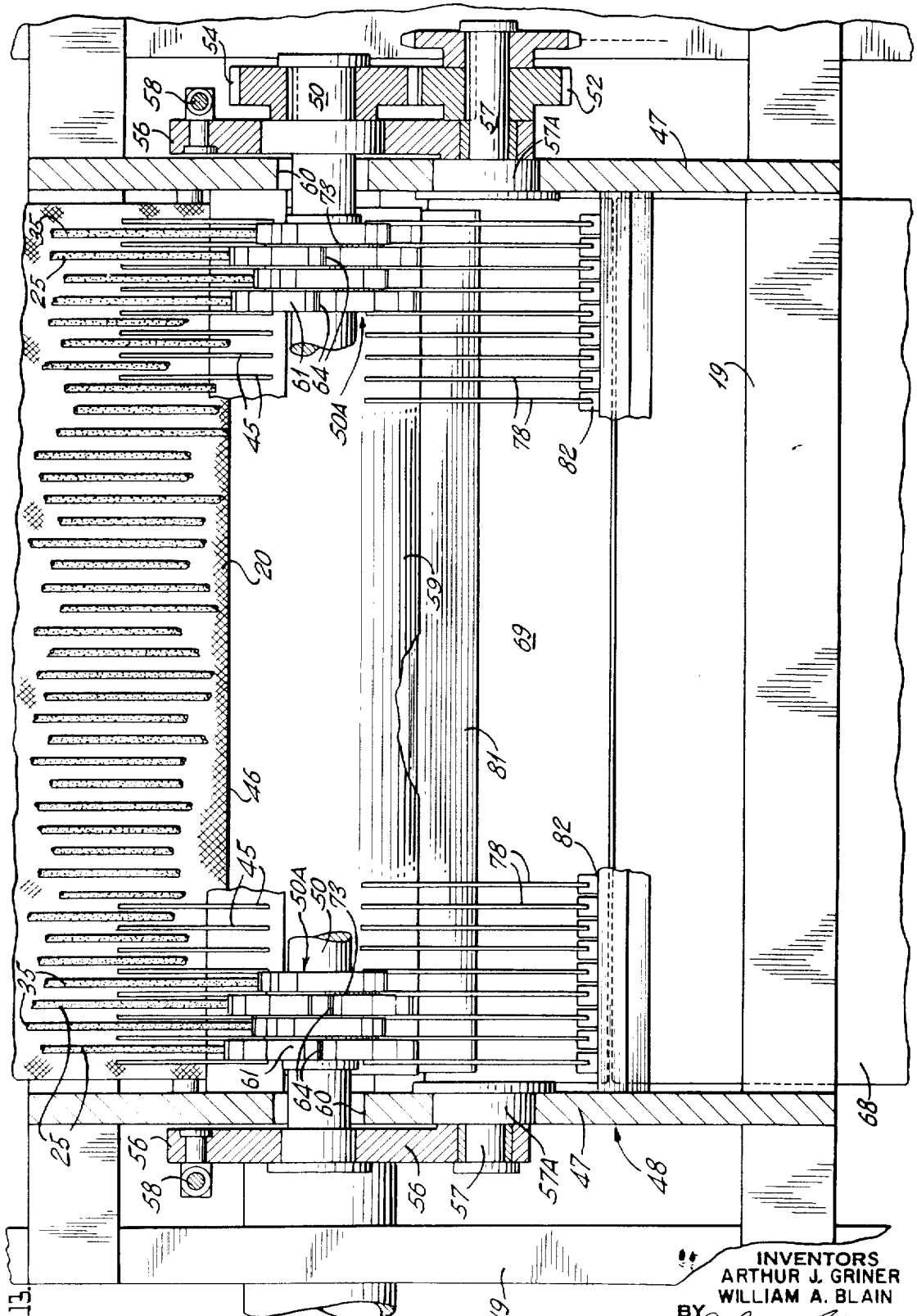

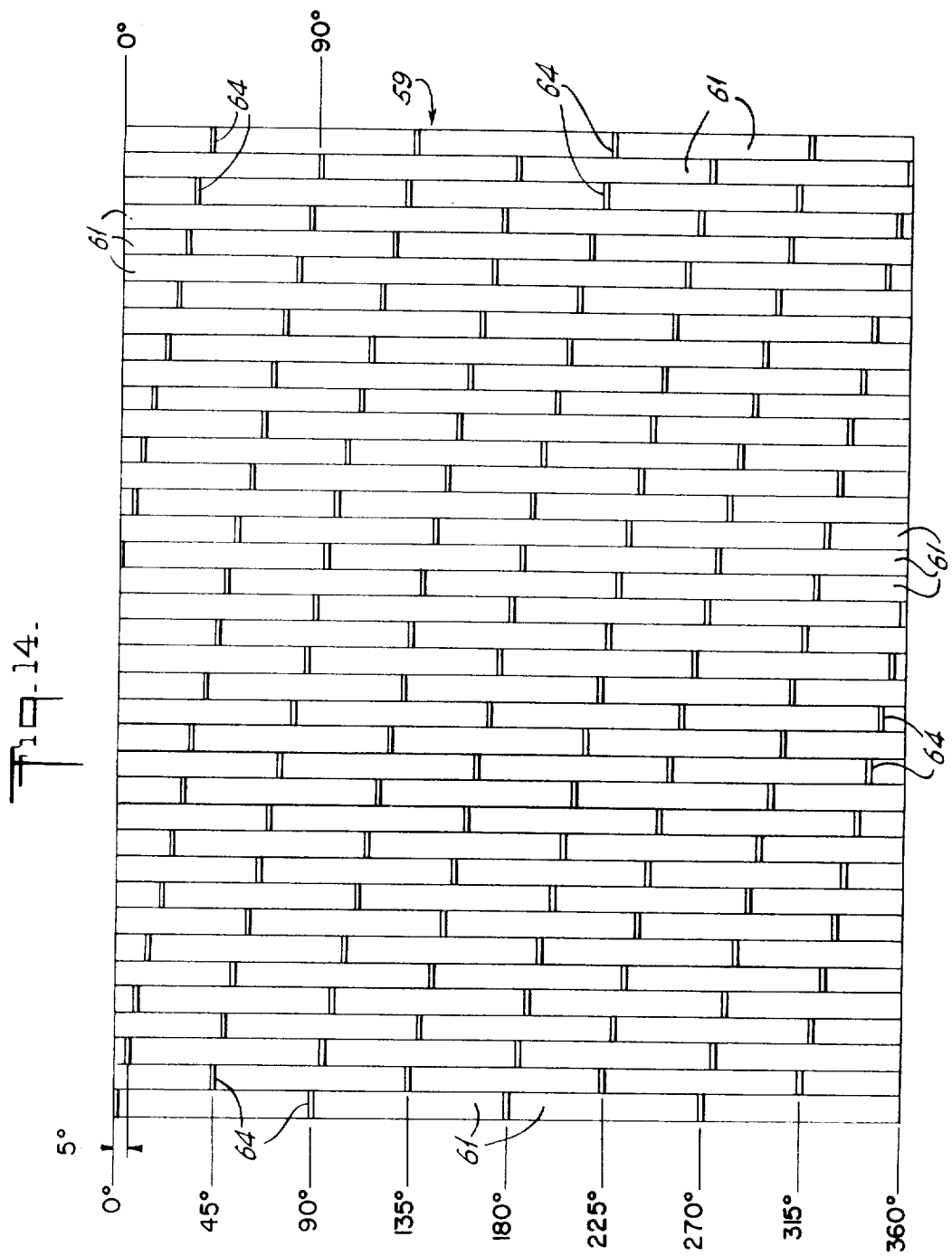

United States Patent Office 3,671,163
Patented June 20, 1972

3,671,163
SNACK FOOD FORMING APPARATUS
Arthur J. Griner, Wyckoff, N.J., and William A. Blain, Spring Valley, N.Y., assignors to Nabisco, Inc.
Filed June 2, 1969, Ser. No. 829,430
Int. Cl. A21c 7/06, 9/02, 11/10
U.S. Cl. 425—297                                    10 Claims

ABSTRACT OF THE DISCLOSURE

An apparatus in which a high pressure housing holds a pre-cooked potato or other vegetable mixture such as corn to be extruded as a plurality of dough strands therefrom through a die plate having a multiplicity of openings in such arrangement that emerging dough strands in upper and lower groups may be integrated for parallel feeding through cutting means and subsequently fed to flaking rolls so that parallel strands of the dough after cutting will form dough pieces otherwise known as collets or puffable half products.

---

This invention relates to apparatus for the production of a crispy chip-type snack food in the form of a half product otherwise known as a potato or corn collet made from pre-cooked starchy vegetable matter such as a potato or corn mixture extruded at high pressure through a die plate. The extrudate is cut to form dough pieces which are flattened between large flaking rolls and then conveyed to a drier preparatory to storage and subsequent deep fat frying. The process is described and claimed in U.S. patent application of common ownership Ser. No. 486,128, filed Sept. 9, 1965 entitled "Process for Making a Puffable Chip-type Snack Food Product."

PRIOR ART

A search of the prior art in connection with this invention does not disclose the structure and advantages inherent therein. Generally, a process disclosed in Pat. No. 3,332,781, issued to J. O. Benson et al. on July 25, 1967 shows the use of a cereal mix in the form of a sheet 16 that is cut to provide the product. The handling of this sheet requires preliminary hardening and stiffening prior to cutting and the use of a single sheet 16 only is disclosed. It will be noted here that the sheet is stretched.

Several patents disclose extrusion means but none show semi-circularly arranged openings as used by applicants to provide a grouped canopy effect. The Pat. 992,369 to F. A. Martoccio, May 16, 1911 shows rows of circular apertures for making hollow tubes of macaroni dough, no space being shown between any single circle of apertures. The prior art is replete with means for looping or draping macaroni or the like into inverted U-shaped forms for movement through a machine for processing such as exemplified by the Pats. 1,801,967 D. F. Merlino, Apr. 2, 1931; 1,985,574 F. Mariani, Dec. 25, 1934; 2,730,050 M. Braibanti et al., Jan. 10, 1956; and 2,800,088 A. Leibundgut, July 23, 1957, the latter of which discloses spreaders 27 (FIG. 15) disk cutters 74 and spaced linear rows of dough strings 28 and 29. Both Pats. 2,863,404 to C. Ambrete et al., Dec. 9, 1958 and 3,229,646 to J. Amato, Jan. 18, 1966 are directed to the handling of paste strings of inverted U-shape. The art does not disclose applicants' invention or method, the latter being disclosed in said patent application of common ownership, Ser. No. 486,128, filed Sept. 9, 1965 by Robert B. Fast et al.

An important object of this inventoin is to produce continuous dough strands through an extrusion die plate having openings so arranged that the extruded dough strands are fed in upper and lower groups in arcuate formation and in a continuous fast operation so that the strands can be arranged in alternate or transposed relation to be guided to a conveyor belt for transport thereby without breakage.

A further object of the invention is to maintain the strands separated by suitable guide pins and peripherally fluted feed rolls so arranged with respect to the fanned-out feed of said strands in upper and lower groups that all of the strands of both groups can be evenly advanced and at the same speed for deposit on a conveyor in evenly spaced arrangement in straight parallel rows for advancement to a cutting roll.

A still further object of the invention is to provide a unique form of cutter with spirally arranged blades providing cutters for each individual strand of dough material individually, and operating to prevent any accumulation of the material as delivered by the conveyor or having been severed by the cutters.

A still further object of the invention is the provision of means for guiding the severed strand pieces for operation between coacting roll means that are slightly spaced at their adjacent peripheries; to so space the rolls that the strands making up the products are expanded laterally to make up a product P which, in its passage between the rollers, may, due to slight compression, assume various fanciful shapes attractive for snack consumption; and to thereafter convey the shaped stands to a drier, cooking or other treatment means as desired, it being evident that the speed with which the upper and lower group of strands are extruded, guided to the conveyor, severed, flaked and further treated to create a finished product P materially reduces the cost of the product and the apparatus lends itself to the making of a large variety of hydrated, crispy, chip-type snacks which may be made from pre-cooked vegetable matter such, for instance as a potato puree or a corn cereal mixture.

With these and other objects in view, the invention comprises certain constructions hereinafter described and then particularly pointed out in the claims and a preferred embodiment of the invention is illustrated in the accompanying drawings, in which:

FIG. 1 is a schematic view in longitudinal elevation showing the entire apparatus for making the product;

FIG. 2 is a full side view in elevation showing the parts of the apparatus in greater detail including a dough strand conveyor, cutting roll and flaking means as shown schematically in FIG. 1;

FIG. 3 is an enlarged sectional view of the dough strand distribution apparatus as illustrated in FIG. 1;

FIG. 4 is a face view in elevation of a die blade or disk used in extruding dough strands, the view being taken substantially on the line 4—4 of FIG. 3;

FIG. 5 is an enlarged fragmentary section taken on the line 5—5 of FIG. 4 showing extrusion of a single strand of material;

FIG. 6 is an end view in elevation of the dough strand distribution apparatus taken on the line 6—6 of FIG. 3;

FIG. 7 is an enlarged longitudinal fragmentary view taken on the line 7—7 of FIG. 3 showing the dough strand guide roller and an outer Teflon sleeve in section;

FIG. 8 is a plan view of the dough strand distributor taken on the line 8—8 of FIG. 6, part of the section being at a lower level to illustrate the operation of the dough strands over the lower rollers and between suitable guide means;

FIG. 9 is an enlarged view taken at the left end of the machine showing the cutting and flaking means and their associated parts;

FIG. 10 is a fragmentary view in perspective showing the finished products after they have passed through the flaking rolls;

FIG. 11 is an enlarged vertical section on the line 11—11 of FIG. 9 showing demountable cutter blades co-acting with a cutter shaft;

FIG. 12 is a vertical section taken on line 12—12 of FIG. 11 showing the mounting means for one of the cutter blades and how it is yieldably supported in the cutter carrier;

FIG. 13 is an enlarged top plan section of FIG. 9 taken on the line 13—13 of the latter and showing the relation of the cutters, cutter roll and flaking rolls through which the product passes to be formed; and FIG. 14 is a plan view schematically developed to show the relative arrangement of the cutters in unaligned lateral relation.

Referring to the drawings in detail and in particular to FIGS. 1 and 2 for a general schematic diagram of the apparatus, 10 indicates an extruder housing including a suitable chamber 11 through which is forced a pre-cooked vegetable composition such as a potato or corn mixture in a coherent mass for the eventual production of a crispy chip-type snack product. The mass is extruded under pressure through a die-plate 12 and as will be explained, through small extrusion openings 13 (FIG. 4) which are divided into arcuate groups of orifices 14 and 15 respectively, above and below the center of said die plate 12 at which diameter an opening is omitted to provide a space 16 between the opposite ends of said arcuate rows of openings.

The extruded strands are carried to suitable rolls rotatably supported in a roll-frame 17 and transferred to a canvas belt conveyor 20 in frame 18, terminating at a main frame 19 in which the operating mechanism, to be later described, is mounted. Beyond the frame 19 a drier oven or the like 21 is provided into which the product is fed by a conveyor belt 22 mounted at one end in the frame 19. The extruding die plate 12 is secured by threaded bolts (FIG. 5) to the exit end of the housing 11 in which the mass 23 to be extruded is under pressure and if desired, the openings 13 may be axially tapered as at 24 so that the added pressure may thoroughly compact the dough strands 25 as they emerge.

The upper group 26 of strands 25 passes through the upper set of orifices 14 and, as seen in FIG. 3, is led, at the beginning of the operation, between the alongside upper guide pins 27, the strands each being positioned in contactual relation with the right surface of each pin 27 as seen in plan view in FIG. 8. The pins 27 are spacedly fixed in a pin bar 28 secured at its ends in the side walls of the roller frame 17 and the strands 25 of material pass over a feed roll 29 which is provided with a circumferentially fluted "Teflon" (registered U.S. trademark for polytetrafluoroethylene to Du Pont) sleeve 31 of which the flutes 30 form guide paths for the strands 25. The shape of the feed roll 29 is duplicated in all the feed rolls 32, 33 and 34, each having fluted "Teflon" sleeves the flutes of which form guides for the strands of dough 25 thus providing a lower group 36 of strands 35 that pass through the lower orifices 15. The sectional shape of each of the rolls is clearly shown in FIG. 7.

The lower group 36 of strands 35 (FIG. 8) is drawn or lead, at the beginning of the operation, between and alongside lower guide pins 37, which are arranged vertically in sidewise spaced relation, and in contactual relation with said strands 35 adjoining the left side of said pins as seen in plan view in FIG. 8. The pins are secured to a fixed cross bar 40.

The purpose of the left and right hand contact of the dough strands with their respective pins is to effect integration of the strands in further travel as they pass beneath a cross shaft 38 which controls the tension of the strands as well as guiding them in their travel between the guide pins 39 on cross bar 39A between each of which pins in alternate arrangement, the strands 25 and the strands 35 passing as clearly shown in FIG. 8. In this manner each strand 25 and 35 will engage one of the grooves in the surface of roll 34 and be fed onto the canvas belt conveyor 20, these parts being fully seen in FIG. 3.

Referring again to FIGS. 1 and 2, the rolls, 29–34 through the medium of a chain drive 41 from a motor 42 (the chain 43 of which also propels the belt conveyor 20) are synchronously operated to feed the strands of dough 25 and 35 at the same speed so that they will fall evenly onto the belt 20 in juxtaposition and parallel to each other. The chain 41 operates a belt drive wheel 44 for propulsion of the belt 20, whose leftward end passes beneath side guide strips 45 (FIGS. 1 and 13), between which passes one strand of material as it approaches the cutter means 50A shown clearly in FIG. 9. The belt 20 at this terminal end passes over a roller 46 pivoted in the side walls 47 of cutter frame 48 superjacent the main frame 19.

The frame 19 carries, adjacent the cutter frame 48, a motor 49 (FIG. 2) which through sprocket chain 51 drives upper and lower idler gears 52 and 53; respectively, for respective mesh with a knife shaft operating gear 54 and a cutter roll operating gear 55, FIGS. 2 and 13. The knife shaft 50 or arbor (FIG. 13) is keyed to gear 54 and is journalled at opposite sides of the cutter frame 48 in adjustable throw arms 56 pivoted at one end as at 57 to said cutter frame and each fixed at opposite free ends in adjusting screw supporting means 58 whereby the cutters, and the cutter shaft 50 supporting the same, can be closely adjusted toward and away from the surface of a cutting knife roll 59 by reason of shaft openings 60 in the opposite walls of the cutter frame 48. The pivot shaft 57, at opposite sides of the machine, has a flanged bearing 57A in the side walls of frame 48.

The cutting knife means, FIGS. 9, 11, 12 and 14 consists of a series of circular collars 61 keyed as shown in a single instance in FIG. 9 as at 62 to the arbor or shaft 50. Each collar 61 has four circumferentially spaced sets of jaws 63 between which a knife blade 64 may be clamped so that the blade thereof is in horizontal position. While only one key 62 and its keyway is shown in FIG. 9 the invention employs, as an important feature, a cutter assembly as shown in FIG. 14 wherein the individual cutters 64 can be positioned in adjacent collars 61 so that they may be positioned approximately five degrees of circumferential distance apart, whereby the pieces of the dough strands product will not be cut along a straight line from opposite sides of the cutter but will be cut in staggered relationship as clearly shown in the arrangement of the cutting blades in FIG. 14. The reason for offsetting the cutters is to prevent the piling-up or jamming of the cut products which would cause them to be united and eventually produce distorted shapes.

The motor 49 through a chain drive 65 FIG. 2, is arranged to operate through meshing gears 66 and 67 a pair of flaking rolls 68 and 69 which, as shown in FIG. 9, comprise large rotating steel cylinders slightly separated to provide necessary spacing to unite random strands of dough pieces laterally in compression, as they pass between the rolls 68 and 69. The result of this passage is to produce products P of different shapes and variations as seen in FIG. 10 thus avoiding mechanically unnatural appearing snack food pieces. As seen in FIG. 2, each cylinder 68 and 69 is connected with a source of refrigerant through pipes 71 and 72 respectively, so that the product will be suitably cooled. Referring to FIGS. 9, 11 and 12 the collars 61 are separated slightly by spacer plate rings 73 between which knives 64, which are as wide in width as the collars 61, are positioned for yieldable sliding movement against the action of coil springs 74 pocketed in suitable bores 75 in the collars 61, but limited in movement by a slide bolt arrangement or bayonet stop 76 mounted in the jaws 63 of said collars and passing through an opening 77 in each cutter blade or knife 64. The cutting knife roll 59 being of hardened steel, the yield of the slidable knives produces a clear severance of the dough strands 25 and prevents undue wear of the roll 59.

The roll 59 discharges the cut lengths of dough strands 25 between partition plates 78, which are aligned with the previously mentioned side guide strips 45, and are spaced sufficiently apart to receive a strand of the dough material which is being cut as at 79 (FIG. 9) or has been cut as at 80 and falls by gravity to a position between the flaking rolls 68 and 69.

A doctor blade 81 coacts with the knife roll 59, and the partition plates or blades 78 are supported in bracket means 82 mounted on the side walls 47 of the frame 48. Partition plates 78 lead downwardly to a point at which the rolls 68 and 69 coact so that the strands of the dough material are properly directed to the passageway between the flaking rolls where lateral pressure causes some of the strand pieces to be joined to provide random shaped products P as exemplified in FIG. 10. It is evident that the invention provides a unique means of extruding the dough strands by forming upper and lower opposed canopy-like formations which lend themselves to form an interposing arrangement which accelerates the feed action so that a multiplictiy of strands can be fed at high speed, without stretching or distortion and in shape preserving form.

The invention is not to be restricted to the precise details of construction shown since various changes and modifications may be made therein without departing from the scope of the invention or sacrificing the advantages to be derived from its use.

What is claimed is:

1. Apparatus for producing a chip type snack food in the form of a half product comprising in combination die means for extruding a plurality of continuous dough strands, strand flattening roll means spaced from said die means, means for conveying said extruded dough strands in spaced parallel relation to a position adjacent said roll means, and cutting and feeding means between said conveying means and said roll means for transversely severing said spaced parallel dough strands to form strand pieces of dough and for feeding said strand pieces of dough into said roll means to be flattened into chip form, said cutting and feeding means includes a knife engaging roll positioned beneath said strands at the end of said conveying means, a motor driven rotary member extending across said dough strands, a plurality of cutters mounted on and fixed to said member to rotate therewith, each cutter being in alignment with only one of said strands and different cutters being aligned with different strands to engage said knife engaging roll and sever said strands, cutters aligned with adjacent strands having a fixed angular displacement with respect to each other about the periphery of said rotary member to sever the adjacent strands at different intervals whereby adjacent strand pieces are fed into said roll means at different times to prevent excessive uniting of said strand pieces during flattening by said roll means.

2. Apparatus according to claim 1, wherein a group of blades circumfrentially spaced about said rotary member are aligned with each dough strand, each blade in a group having a fixed angular displacement with respect to the blades in an adjacent group.

3. Apparatus according to claim 1, wherein said rotary member includes a shaft extending across said dough strands and spacing collars fixed to said shaft in sidewise abutting relationship, each collar being in alignment with a different dough strand, the blades corresponding in width to said collars and resiliently secured thereto.

4. Apparatus according to claim 1, wherein said collars are keyed in successively advancing angular positions on the shaft whereby said blades are arranged in a helical formation to sever the different dough strands at different points along their path of travel.

5. Apparatus for producing a chip type snack food in the form of a half product comprising in combination die means provided with a plurality of extrusion openings arranged in groups for extruding groups of dough strands, a first roller, first strand guiding means between said die means and said first roller for receiving a first group of strands and placing the strands in spaced parallel relation at said first roller, a second roller spaced from said first roller, second strand guiding means between said die means and said second roller for receiving a second group of strands and placing the strands in spaced parallel relation at said second roller, a third roller, third strand guiding means between said first and second rollers and said third roller for interlacing the strands of said first and second groups, to place all of the strands in spaced parallel relation at said third roller, dough flattening roll means, means for conveying said strands from said third roller to adjacent said roll means, and cutting and feeding means for transversely severing said spaced parallel dough strands to form pieces of dough and for feeding said strand pieces into said roll means to be flattened into chip form.

6. Apparatus according to claim 5, wherein said extrusion openings in said die plate are arranged in a circle, the openings above and below the center of the circle constituting the two groups, said first roller being positioned above the center of the circle and the second roller being positioned below the center of the circle, said third roller being horizontally spaced from said first and second rollers.

7. Apparatus according to claim 5, wherein said first, second and third rollers are synchronously driven.

8. Apparatus according to claim 7, including a conveyor driven in synchronism with said rollers for receiving said dough stands and conveying the strands to said cutting and feeding means.

9. Apparatus according to claim 5, wherein said cutting and feeding means includes a motor driven rotary member extending across said strands, a knife blade mounted on said member in alignment with each of said strands to be driven with said member, blades aligned with adjacent strands being angularly displaced to sever the adjacent strands at different times.

10. Apparatus according to claim 6, wherein said cutting and feeding means includes a shaft extending across said dough strands, collars fixed to said shaft in sidewise abutting relationship, each collar being in alignment with a single dough strand, blades secured to said collars and corresponding in width thereto and knife engaging roll means positioned on the reverse side of said strands to coact with said blades in severing said strands, and collars being keyed in successively advancing angular positions on said shaft so that said blades are arranged in helical formation to sever the different dough strands at different points along their path of travel.

References Cited

UNITED STATES PATENTS

| | | | |
|---|---|---|---|
| 1,055,600 | 3/1913 | Beck | 107—68 |
| 2,225,106 | 12/1940 | Franke | 107—68 |
| 2,892,422 | 6/1959 | Casale | 107—69 X |
| 2,938,474 | 5/1960 | Filler | 107—69 |
| 3,307,503 | 3/1967 | Elmer et al. | 107—69 |
| 3,439,632 | 4/1969 | Pirotsky | 107—4 R X |
| 3,444,826 | 5/1969 | Seeder et al. | 107—4 R |
| 1,730,932 | 10/1924 | Alisce | 107—14 A |
| 1,924,826 | 8/1933 | Anderson | 107—14 BA |
| 1,010,175 | 11/1911 | Pooley | 107—14 CA |

FRANK L. ABBOTT, Primary Examiner

H. E. RADUAZO, Assistant Examiner

U.S. Cl. X.R.

425 305, 308, 327, 340